United States Patent [19]

Kürbitz et al.

[11] 4,201,931
[45] May 6, 1980

[54] APPARATUS FOR PROTECTING THE TARGET OF AN IMAGE-PRODUCING TUBE FROM INJURIOUSLY HIGH LOCAL CURRENT DENSITIES

[75] Inventors: Gunther Kürbitz, Aalen-Ebnat; Walter Wegener, Aalen; Hans-Richard Weinheimer, Königsbronn, all of Fed. Rep. of Germany

[73] Assignee: Carl Zeiss-Stiftung, Oberkochen, Fed. Rep. of Germany

[21] Appl. No.: 837,016

[22] Filed: Sep. 27, 1977

[30] Foreign Application Priority Data

Oct. 6, 1976 [DE] Fed. Rep. of Germany ....... 2645032

[51] Int. Cl.² .............................................. H01J 31/26
[52] U.S. Cl. ..................................... 315/10; 358/219
[58] Field of Search ................... 315/10, 379, 30, 381, 315/383; 358/219, 168, 220, 243

[56] References Cited

U.S. PATENT DOCUMENTS

| 2,911,562 | 11/1959 | Fathauer | 315/30 |
| 3,435,275 | 3/1969 | Bauman | 315/10 |
| 3,600,520 | 8/1971 | Slark | 315/10 |
| 3,652,792 | 3/1972 | Usagawa | 358/219 |
| 3,864,594 | 2/1975 | Svensson | 315/10 |

Primary Examiner—Theodore M. Blum
Attorney, Agent, or Firm—Hopgood, Calimafde, Kalil, Blaustein & Lieberman

[57] ABSTRACT

The invention contemplates circuit arrangements to protect the target of an image-producing tube from injuriously high local current densities, wherein detector means is responsive to produce an electrical pulse at onset of an unacceptably high local-illumination intensity condition at the cathode. The target-cathode excitation circuit includes switch means with a resistance-changing characteristic, and so connected to respond to the electrical pulse as to rapidly reduce electron flow between the cathode and target of the tube, upon occurrence of such electrical pulse output.

7 Claims, 4 Drawing Figures

APPARATUS FOR PROTECTING THE TARGET OF AN IMAGE-PRODUCING TUBE FROM INJURIOUSLY HIGH LOCAL CURRENT DENSITIES

This invention relates to an arrangement for protecting the target of an image-producing tube from injuriously high local current densities.

If processes which proceed with locally limited intensive development of light, for instance the firing flash or impact of shells on the target, are observed by means of an image converter, image intensifier or highly sensitive television-camera tube, the fluorescent screen or the target of said tube is struck by a stream of electrons which can locally reach an injuriously high current density. Such a current density leads to a local overloading of the fluorescent screen or target and results in an ion spot or partial or total destruction of the target.

It has already been proposed to arrange, in the immediate vicinity of an image intensifier tube, the pole shoes of an electromagnet and a sensor means for detecting flashes as well as means which trigger a current pulse through the coils of the electromagnet upon the occurrence of a light flash. The magnetic field thereby produced deflects the stream of electrons proceeding from the cathode in such a manner that it no longer strikes against the fluorescent screen.

As has been shown by experiments, the known arrangement does not completely eliminate the possibility of ion spots on the fluorescent screen of the image intensifier tube. Furthermore, it is relatively expensive, since the image intensifier tube and the electromagnet should form an integrated unit in order to achieve a reliable deflection of the stream of electrons.

The object of the present invention is to provide an arrangement for protecting the target of an image-producing tube from injuriously high local current densities which will operate reliably, without great expense.

In the present description, the expression "image-producing tube" will be understood to refer to an image-intensifier tube, to an image-converter tube, or to a television-camera tube, and the expression "target" will in general be understood to refer to the fluorescent screen or to the anode of such a tube.

The object of the present invention is achieved by means of a detector to produce a switch pulse in the detected circumstance of locally high illumination intensity in the image produced on the cathode; the detector output is connected with a control unit, and a switch element with variable resistance is so arranged in the cathode-target circuit and connected with the output of the control unit that its resistance rapidly changes, upon the occurrence of a switch pulse, the rapid change being to a value which reduces the flow of electrons between cathode and target.

It is advantageous to arrange, in parallel to the cathode-target path, a switch which closes upon the occurrence of a switch pulse and thus short-circuits the voltage between cathode and target. In this way, the electron stream is reduced to a value close to zero, so that the possibility of damage to the target is avoided upon the occurrence of locally high illumination intensity in the image.

It may also be advantageous to provide, within the cathode-target circuit, a switch element whose resistance is greatly increased upon the occurrence of a switch pulse. Upon the occurrence of high local intensities of illumination, the current flowing over the cathode and the target of the tube is so strongly limited by this resistance that the target is not injured.

The object of the invention may also be achieved by employing a detector to produce a switch pulse in the circumstance of locally high illumination intensity in the image produced on the cathode; the detector being connected with a control unit, and a high ohmic resistance being connected in the cathode-target circuit; and a source of light is so arranged in front of the cathode and so connected for response to the output of the control unit that the entire cathode is illuminated with high-intensity illumination, upon the occurrence of a switch pulse.

Upon the occurrence of high local intensities of illumination in the image, the light source in front of the cathode is subjected to the current pulse from the control unit, and is excited to emit light. As a result, the entire cathode of the image-producing tube is flooded, and the high electron stream thereby released produces such a large voltage drop over the high ohmic resistance in the cathode-target circuit that only a relatively small voltage remains between cathode and target. The electrons which are accelerated by this voltage have so little energy that the target is not damaged.

The invention will be explained in further detail below with reference to FIGS. 1 to 4 of the accompanying drawings, in which.

Figure 1:
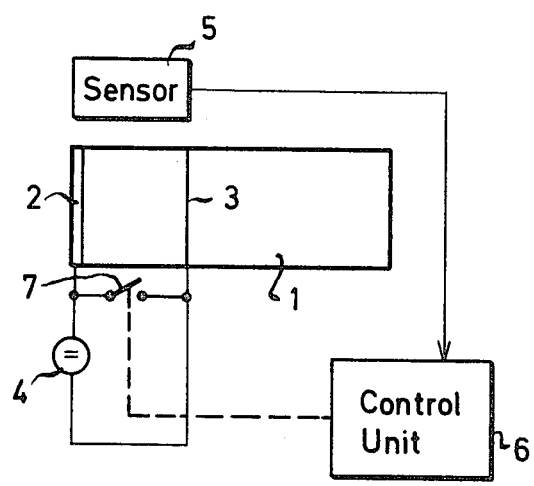
FIG. 1 is a schematic diagram to show one embodiment of an arrangement for the protection of an image-producing tube.

In FIG. 1, 1 is an image-producing tube which contains a cathode 2 and a target 3. The voltage between cathode 2 and target 3 is produced by means of a diagrammatically indicated DC generator 4. When the tube 1 is used, an image is produced on the cathode 2, said image liberating electrons from the cathode in an amount corresponding to the local luminance. These electrons are accelerated to the target 3 under the action of the field produced by the output of generator 4, producing an intensified image signal there.

A sensor 5, which may be a photoelectric receiver, is so arranged with respect to the tube 1 that the image produced on the cathode 2 is produced simultaneously on the receiving surface of said sensor. The signal produced by the sensor 5 is fed to a control unit 6. A switch 7 is provided parallel to the cathode-target path, the switch being open during normal operation and thus maintaining the DC voltage, between cathode 2 and target 3.

As soon as a high local intensity of illumination occurs in the image produced on cathode 2, te control unit 6 will supply a switch pulse which closes the switch 7. Thus the voltage between cathode 2 and target 3 is short-circuited and practically no further current flows to the target 3. After termination of the short-circuit, i.e., upon termination of the observed high local intensity of illumination in the image, the generator 4 slowly again builds up a voltage between cathode and target, with accompanying slow removal of the electrons which have been liberated from the cathode 2. Since the focus of the electron optical system is lost as a result of the intervening absence of the target voltage, the electron charge liberated from the cathode will strike the target 3 over a longer period of time and a larger surface, so that the average local electron current density is too low to damage the target.

The switch 7 may be an electronic switch, for example, a triggered spark path, a gas discharge tube, or a semi-conductor device. Sensor 5 and control unit 6 respond so rapidly that the switch 7 is closed before the target can be damaged by excessively high electron current densities.

Figure 2:
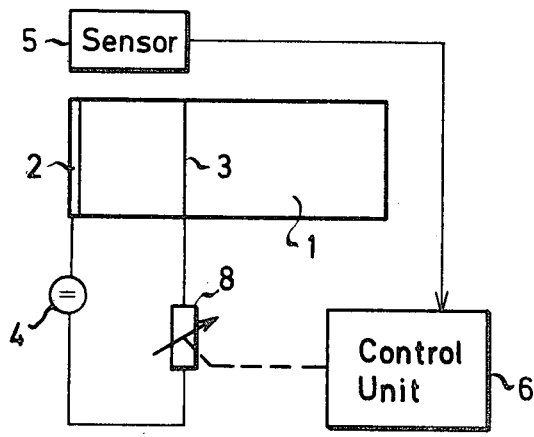
FIGS. 2 and 3 are similar diagrams showing further embodiments of such an arrangement.

In the embodiment shown in FIG. 2, a switch 8 is placed in the circuit of the generator 4 and the cathode-target path of the image-producing tube 1, said switch having the action of a variable resistor controlled by the control unit 6. Upon detection of a high local intensity of illumination in the observed image, a switch pulse is released via the sensor 5 and the control unit 6, thus greatly increasing the resistance of the switching element 8. Such a high resistance is thereby produced that the current flowing in the circuit of cathode 2 and target 3 of the tube 1 becomes so small that the target cannot be injured.

Figure 3:
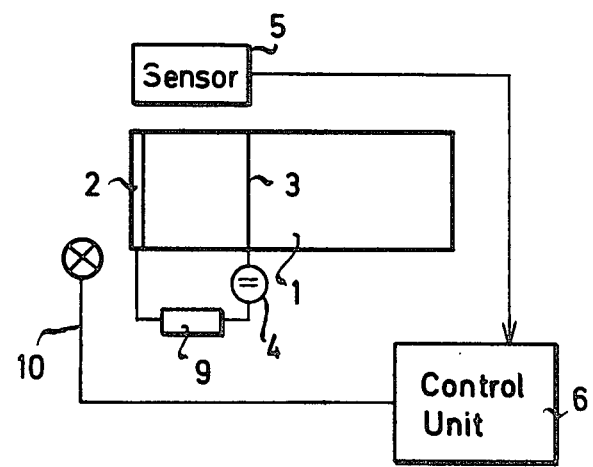

In the arrangement shown in FIG. 3, the high ohmic resistor 9 is connected in the cathode-target path. The value of resistor 9 is selected such that the voltage drop caused by it upon normal operation of the image-producing tube 1 only insignificantly decreases the voltage between cathode 2 and target 3. A source of light 10 is additionally so arranged in front of the cathode 2 that, upon excitation, it completely illuminates the cathode.

When the control unit 6 is triggered by sensor 5, the unit 6 delivers a current pulse of suitable shape and length to the source of light 10, which may be a light-emitting diode, thereby exciting it to emit light. As a result, the entire cathode 2 of the image producing tube 1 is flooded. The electron stream which is thereby released produces such a large voltage drop over the high-ohmic resistor 9 that only a relatively slight voltage remains between cathode 2 and target 3. The electrons which are accelerated by this voltage are at such low energy level that the target is not injured.

Figure 4:
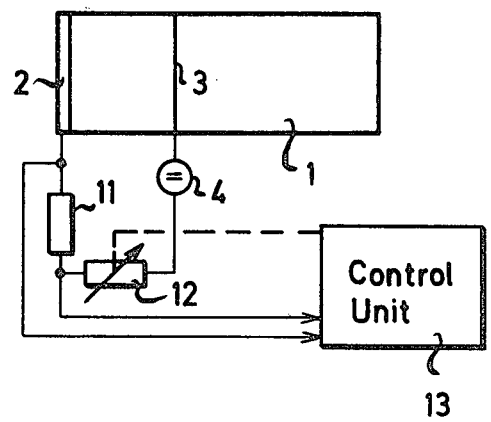
FIG. 4 is a similar diagram to show the embodiment of FIG. 2 with a different detector.

In the embodiment of FIG. 4, a further resistor 11 is connected in the cathode-target circuit, along with the generator 4, and a switch element 12 characterized by variable resistance. The voltage drop over the resistor 11 is picked off and supplied as input voltage to the control unit 13.

Upon occurrence of high local intensities of illumination in the image produced on the cathode 2, the current flowing through the resistor 11 changes very rapidly. The control unit 13 is so characterized that it responds to small, rapidly changing currents and thereby produces a switch-operating pulse which very rapidly and greatly increases the resistance of the switch element 12. The switch element 12 may be, for example, a transistor unit.

The control unit 13 responds only to rapidly increasing currents but not to small or larger constant or slowly variable currents. Thus it can be used in combination with a sensor such as resistor 11, in the same manner as the photoelectric sensor 5 shown in FIGS. 1 to 3.

It is possible, and in many cases advantageous, to combine in any desired manner the protective circuits shown in FIGS. 1 to 3. In this way, a higher degree of protection for the image-producing tube is obtained.

What is claimed is:

1. Apparatus for protecting the target of an image-producing tube from injuriously high local current densities, attributable to excessively high local-illumination at the cathode of such tube, comprising detector means responsive to onset of an unacceptably high local-illumination intensity condition at the cathode, such response producing an electrical pulse output upon occurrence of said condition, control means connected to the output of said detector means, a cathode-target excitation circuit including a variable-resistance element, and means connected to said control means and operative to rapidly change the resistance of said variable-resistance element upon the occurrence of such an electrical pulse output of said detector means, such rapid change being in the direction and to a value which reduces electron flow between the cathode and target of the tube.

2. Apparatus for protecting the target of an image-producing tube from injuriously high local current densities, attributable to excessively high local-illumination at the cathode of such tube, comprising detector means responsive to onset of an unacceptably high local-illumination intensity condition at the cathode, control means connected to the output of said detector means and producing an electrical pulse output upon occurrence of said condition, a cathode-target excitation circuit including normally open switch means connected across said cathode-target excitation circuit, and means connected to said control means and operative to rapidly close said switch means upon the occurrence of an electrical pulse output of said control means, thereby shunting the cathode-target excitation.

3. Apparatus according to claim 2, in which said switch means includes an element series-connected in the cathode-target excitation circuit, said element having a resistance which is greatly increased upon the occurrence of such electrical pulse output of said detector means.

4. Apparatus for protecting the target of an image-producing tube from injuriously high local current densities, attributable to excessively high local-illumination at the cathode of such tube, comprising detector means responsive to onset of an unacceptably high local-illumination intensity condition at the cathode, control means connected to the output of said detector means and producing an electrical pulse output upon occurrence of said condition, a cathode-target excitation circuit including switch means selectively connecting or effectively disconnecting said tube with respect to said cathode-target excitation circuit, and means connected to said control means and operative to rapidly operate said switch means to effectively disconnect said cathode-target excitation circuit with respect to said tube, upon the occurrence of an electrical pulse output of said control means, thereby reducing electron flow between the cathode and target of the tube, said detector means comprising a resistor series-connected in said cathode-target excitation circuit, said control means being operatively connected to said switch means and including a voltage-drop pick-off connection across said resistor, and said control means producing an electrical pulse output only in response to detection of a rapidly increasing voltage.

5. Apparatus for protecting the target of an image-producing tube from injuriously high local current densities, attributable to excessively high local-illumination at the cathode of such tube, comprising detector means responsive to onset of an unacceptably high local-illumination intensity condition at the cathode, control means connected to the output of said detector means and producing an electrical pulse output upon occurrence of said condition, a cathode-target excitation circuit comprising a series-connected high ohmic resistor, and a relatively high-intensity light source positioned to flood the cathode when the light source is excited, said light source being connected to said control means such that light-source excitation is upon the occurrence of such electrical pulse output of the control means.

6. Apparatus according to claim 2 or claim 4 or claim 5, in which said detector means is a photoelectric receiver disposed to monitor the image produced on the cathode of the image-producing tube.

7. Apparatus for protecting the target of an image-producing tube from injuriously high local current densities, attributable to excessively high local-illumination at the cathode of such tube, comprising a cathode-target excitation circuit including a series-connected resistor, control means including a voltage-drop pick-off connection across said resistor and producing an electrical pulse output only in response to detection of a rapidly increasing voltage drop, a variable resistance element additionally series-connected in said cathode-target excitation circuit and being so connected to said control means that its resistance is greatly increased upon the occurrence of an electrical pulse output.

* * * * *